United States Patent
Nakahara et al.

(10) Patent No.: US 10,241,807 B2
(45) Date of Patent: Mar. 26, 2019

(54) VEHICLE CONTROL DEVICE, REPROGRAMMING SYSTEM

(71) Applicant: Hitachi Automotive Systems, Ltd., Hitachinaka-shi, Ibaraki (JP)

(72) Inventors: Fumiharu Nakahara, Hitachinaka (JP); Kenichi Kurosawa, Hitachinaka (JP)

(73) Assignee: HITACHI AUTOMOTIVE SYSTEMS, LTD., Hitachinaka-shi (JP)

(*) Notice: Subject to any disclaimer, the term of this patent is extended or adjusted under 35 U.S.C. 154(b) by 0 days.

(21) Appl. No.: 15/502,552

(22) PCT Filed: Aug. 17, 2015

(86) PCT No.: PCT/JP2015/072985
§ 371 (c)(1),
(2) Date: Feb. 8, 2017

(87) PCT Pub. No.: WO2016/047312
PCT Pub. Date: Mar. 31, 2016

(65) Prior Publication Data
US 2017/0228236 A1   Aug. 10, 2017

(30) Foreign Application Priority Data

Sep. 26, 2014   (JP) .................. 2014-196089

(51) Int. Cl.
*G06F 9/445* (2018.01)
*B60R 16/023* (2006.01)
(Continued)

(52) U.S. Cl.
CPC .......... *G06F 9/445* (2013.01); *B60R 16/0231* (2013.01); *B60W 50/00* (2013.01);
(Continued)

(58) Field of Classification Search
CPC ... B60W 2050/0019; B60W 2050/0014; G06F 9/445; G06F 11/22
(Continued)

(56) References Cited

U.S. PATENT DOCUMENTS

2007/0005204 A1   1/2007   Yamamoto et al.
2008/0046881 A1*  2/2008   Braghiroli ................. G06F 8/65
                                                              717/173
(Continued)

FOREIGN PATENT DOCUMENTS

| JP | 2000-259422 A | 9/2000 |
| JP | 2005-71155 A | 3/2005 |

(Continued)

OTHER PUBLICATIONS

Partial Supplementary European Search Report issued in corresponding application No. 15844264.0 dated Apr. 23, 2018.
(Continued)

*Primary Examiner* — John Q Chavis
(74) *Attorney, Agent, or Firm* — Foley & Lardner LLP (57) ABSTRACT

Provided is a vehicle control device with which it is possible to reduce the time required to rewrite a control program. In the vehicle control device according to the present invention, after an updated version of the control program has been stored in a second storage unit, a first storage unit is initialized in advance before the instruction to update the control program has been executed.

11 Claims, 8 Drawing Sheets

(51) Int. Cl.
  *G05D 1/00* (2006.01)
  *B60W 50/00* (2006.01)
  *G06F 11/22* (2006.01)

(52) U.S. Cl.
  CPC ........... *G05D 1/0088* (2013.01); *G06F 11/22* (2013.01); *B60W 2050/0005* (2013.01); *B60W 2050/0014* (2013.01); *B60W 2050/0019* (2013.01); *B60W 2050/0036* (2013.01); *B60W 2050/0065* (2013.01)

(58) Field of Classification Search
  USPC ........................................................ 717/174
  See application file for complete search history.

(56) References Cited

U.S. PATENT DOCUMENTS

| | | | |
|---|---|---|---|
| 2009/0125897 A1 | 5/2009 | Matlin et al. | |
| 2011/0208956 A1 | 8/2011 | Fislage | |
| 2011/0307879 A1* | 12/2011 | Ishida | G06F 8/658 |
| | | | 717/170 |
| 2014/0109075 A1* | 4/2014 | Hoffman | G06F 8/65 |
| | | | 717/169 |
| 2015/0191138 A1* | 7/2015 | Quintero | B60R 16/0231 |
| | | | 701/33.9 |
| 2015/0242198 A1* | 8/2015 | Tobolski | G06F 8/61 |
| | | | 717/172 |
| 2016/0041820 A1* | 2/2016 | Ricci | H04W 4/21 |
| | | | 717/172 |
| 2016/0196132 A1* | 7/2016 | Searle | H04L 41/082 |
| | | | 717/173 |

FOREIGN PATENT DOCUMENTS

| | | |
|---|---|---|
| JP | 2006-301960 A | 11/2006 |
| JP | 2010-140325 A | 6/2010 |
| WO | WO 2012/114194 A1 | 8/2012 |

OTHER PUBLICATIONS

Extended European Search Report dated Sep. 10, 2018 in European Patent Application No. 15844264.0.

* cited by examiner

VEHICLE CONTROL DEVICE, REPROGRAMMING SYSTEM

TECHNICAL FIELD

The present invention relates to a vehicle control device.

BACKGROUND ART

A vehicle control device includes an operation device for executing a control program which implements an operation to control a vehicle (for example, microcomputer) and a storage device such as a flash read only memory (ROM) for storing the control program. The control program is rewritten into an updated version, for example, by connecting a reprogramming device to the vehicle during a maintenance work and transmitting the updated version of the control program from the reprogramming device to the vehicle control device via an in-vehicle network.

In recent years, a program size of the control program has been increased as processing has become more complicated. Therefore, the processing for rewriting the control program takes a certain period of time in general. PTL 1 discloses a technique for rewriting control software of an automobile control unit in a short time.

CITATION LIST

Patent Literature

PTL 1: JP 2006-301960 A

SUMMARY OF INVENTION

Technical Problem

There are cases where a vehicle control device uses a storage device such as a flash ROM. It is necessary to initialize a storage region in which old data is stored before data is updated. The initialization processing takes relatively long time in general. When the control program is stored in the above storage device, it is necessary to perform processing for initializing the storage region, in which the old program is stored, before the control program is updated. Therefore, this causes a long updating work.

In PTL 1, the shorter rewriting of control program is enabled by providing a main storage area for storing a current version of the control program and a sub storage area for storing the updated version in a nonvolatile memory. However, in PTL 1, time required to initialize the storage region is not considered.

The present invention has been made to solve the above problems, and a purpose of the present invention is to provide a vehicle control device which can reduce time required to rewrite a control program.

Solution to Problem

In the vehicle control device according to the present invention, after an updated version of the control program has been stored in a second storage unit, a first storage unit is initialized in advance before the instruction to update the control program has been executed.

Advantageous Effects of Invention

In accordance with a vehicle control device according to the present invention, processing for initializing a storage unit is separated from processing for rewriting a control program, and a storage region where an old control program is stored is initialized until the next update. Therefore, rewrite processing can be completed in a short time.

BRIEF DESCRIPTION OF DRAWINGS

FIG. 7 is an operation flow of a startup program 121 when the ignition 3 is turned ON.

DESCRIPTION OF EMBODIMENTS

<First Embodiment>

Figure 1:
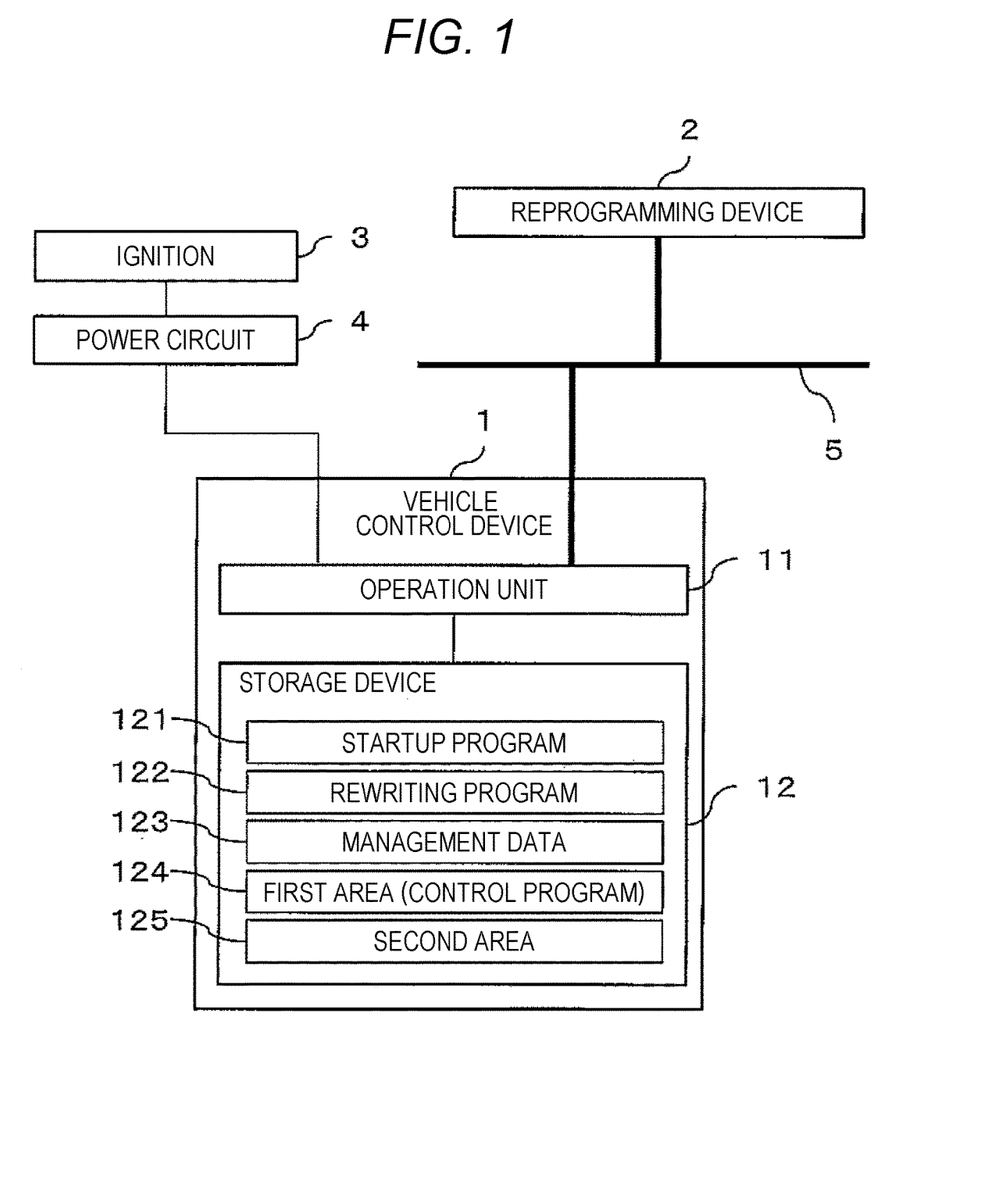
FIG. 1 is a diagram of a configuration of a vehicle control device 1 according to a first embodiment.

FIG. 1 is a diagram of a configuration of a vehicle control device 1 according to a first embodiment of the present invention. The vehicle control device 1 executes a control program which controls an operation of a vehicle. When an ignition 3 included in the vehicle is turned ON, power is supplied to the vehicle control device 1 via a power circuit 4. The vehicle control device 1 is connected to a reprogramming device 2 via an in-vehicle network 5.

The reprogramming device 2 rewrites the control program executed by the vehicle control device 1 to an updated version. For example, an operator connects the reprogramming device 2 to the vehicle during a maintenance work. The operator transmits an update instruction (reprogramming instruction) of the control program and the updated version to the vehicle control device 1 by operating the reprogramming device 2.

The vehicle control device 1 includes an operation unit 11 and a storage device 12. The operation unit 11 is an operation device such as a microcomputer which executes the control program stored in the storage device 12. For convenience of description, there is a case where each of the programs is described as an operating subject. However, the operation unit 11 actually executes the programs.

The storage device 12 is a nonvolatile storage device such as a flash ROM and stores a startup program 121, a rewriting program 122, and management data 123. The storage device 12 further includes a first area 124 and a second area 125.

The startup program 121 is executed by the operation unit 11 at the beginning when the vehicle control device 1 is started in a normal mode. The rewriting program 122 rewrites the control program stored in the first area 124 or the second area 125 to the updated version according to an instruction from the reprogramming device 2. The management data 123 is described below. The first area 124 and the second area 125 are storage regions where the control program is stored. In a state illustrated in FIG. 1, it is assumed that the first area 124 store a current version of the control program and the second area 125 be empty.

Figure 2:
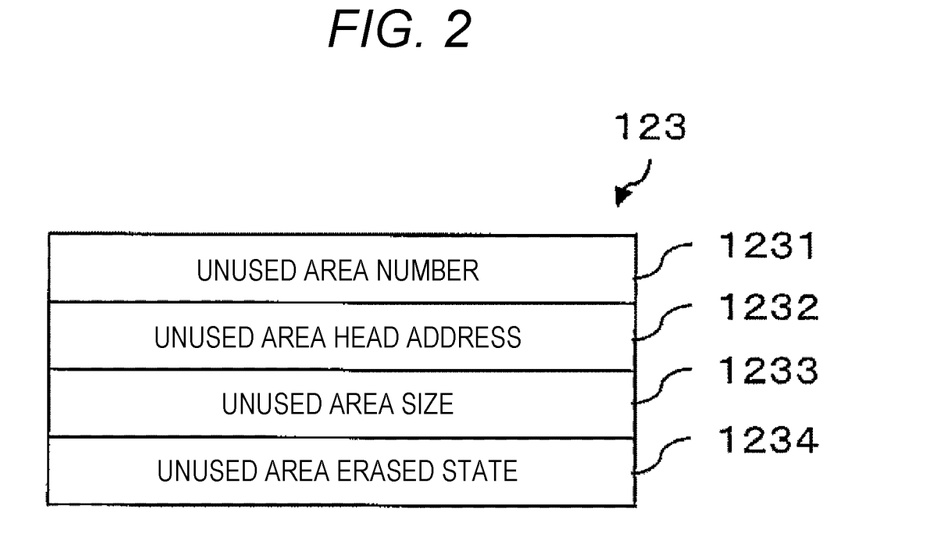
FIG. 2 is a diagram of a structure of management data 123.

FIG. 2 is a diagram of a structure of the management data 123. The management data 123 holds an unused area number 1231, an unused area head address 1232, an unused area size 1233, and an unused area erased state 1234.

The unused area number 1231 holds information indicating which of the first area 124 or the second area 125 stores the current version of the control program. The unused area head address 1232 and the unused area size 1233 respectively hold a head address and an area size of one of the first area 124 or the second area 125 which does not store the current version of the control program. The unused area erased state 1234 holds information indicating whether one of the first area 124 or the second area 125 which does not store the current version of the control program has been completely initialized. A reason for interruption of the initialization is described below.

Figure 3:
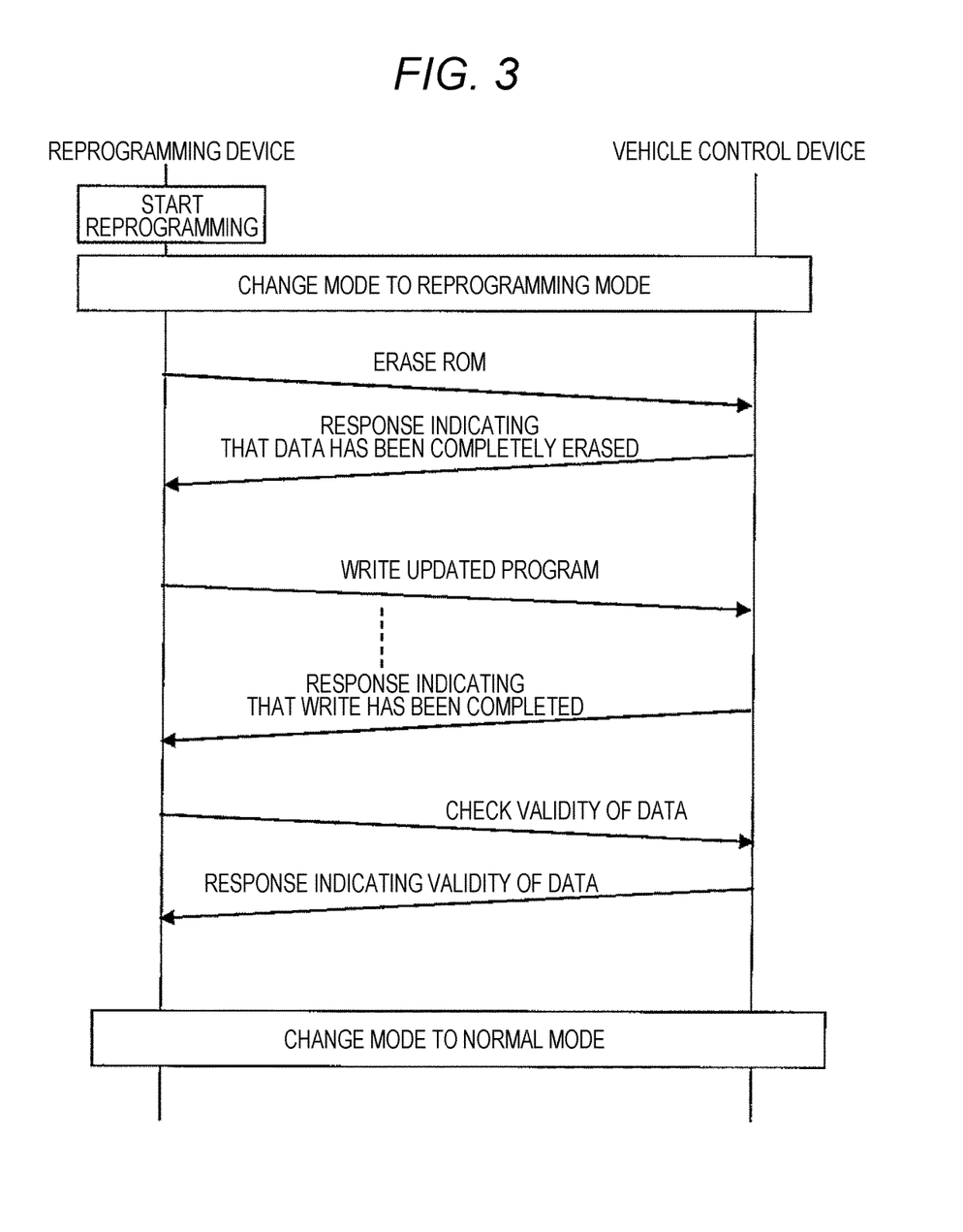
FIG. 3 is a diagram of a traditional reprogramming sequence.

FIG. 3 is a diagram of a traditional reprogramming sequence. FIG. 3 is illustrated for comparison with the present invention. A problem in the traditional reprogramming sequence is described below with reference to FIG. 3.

The operator turns ON the power source (for example, the ignition 3) of the vehicle control device 1. After that, the operator connects the reprogramming device 2 to the vehicle and starts reprogramming (processing for updating the control program). The reprogramming device 2 issues a command that instructs the vehicle control device 1 to update control programming. When the operation unit 11 receives the command, a mode of the operation unit 11 is changed to a reprogramming mode.

The reprogramming device 2 instructs the vehicle control device 1 to erase the old data stored in a ROM area where the control program is stored. The operation unit 11 erases the data in the ROM area according to the instruction. When the data in the ROM area is completely erased, the operation unit 11 issues a response indicating that. The reprogramming device 2 transmits the updated version of the control program to the vehicle control device 1, and the operation unit 11 writes the updated version to the ROM area in which the data has been erased. When the operation unit 11 issues the response that indicating that the write has been completed, both the reprogramming device 2 and the vehicle control device 1 check the validity of the written data. When the validity of the written control program is confirmed, the operation unit 11 ends the reprogramming mode and changes its mode to the normal mode.

In the reprogramming sequence, before the updated version of the control program is written to the ROM, the old data stored in the writing destination region has been previously erased. This is because the ROM stores fixed data and a whole storage region of the ROM is collectively updated in general. Especially, when a device such as a flash ROM is used, the initialization processing takes relatively long time. Regarding the above device, it is necessary not only to simply update the storage region but also to initialize the storage region before the storage region, in which the old data is stored, is updated. Therefore, the initialization processing lowers an efficiency of the reprogramming work.

Figure 4:
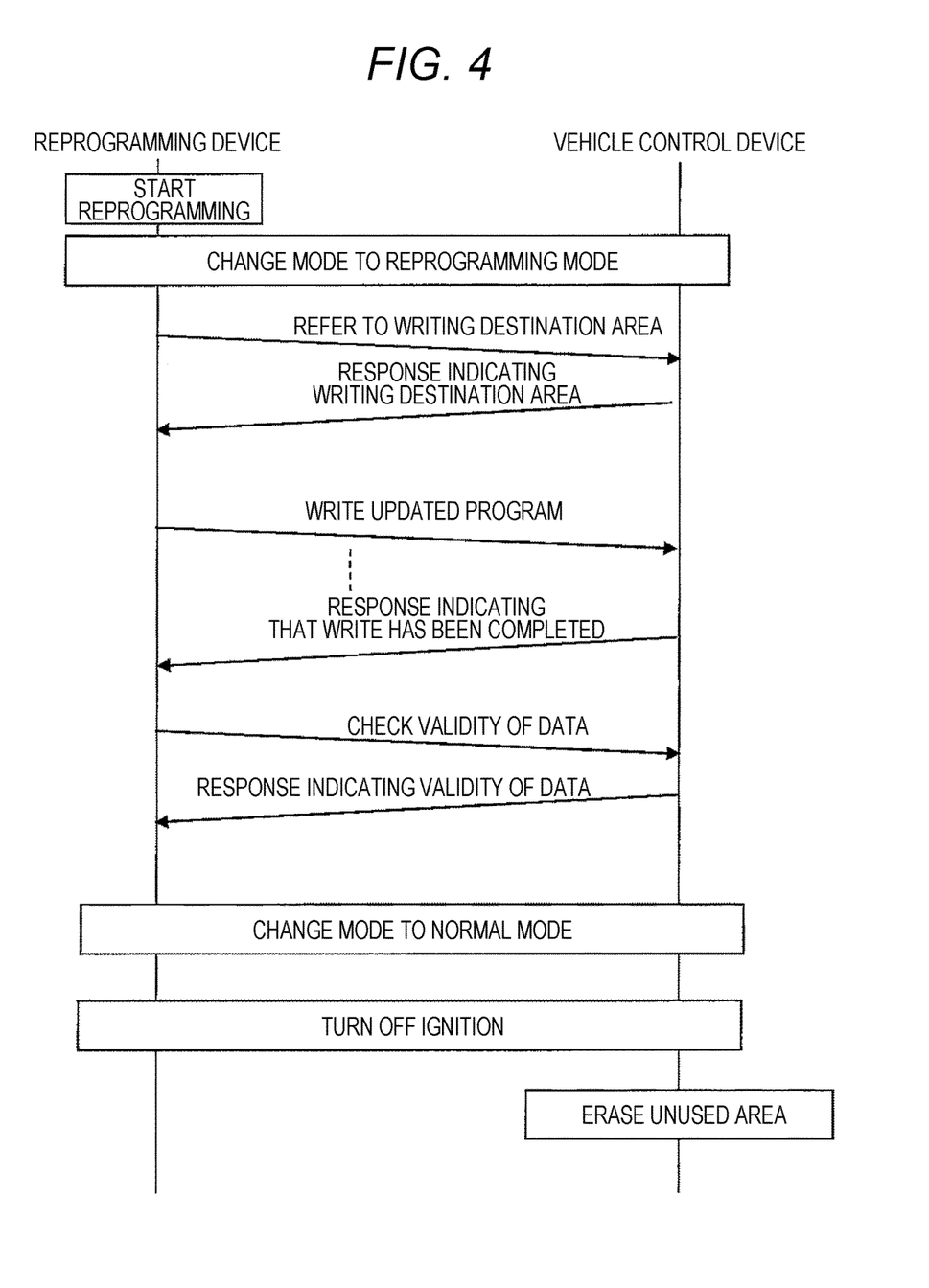
FIG. 4 is a diagram of a sequence to perform reprogramming by the vehicle control device 1 according to the first embodiment.

FIG. 4 is a diagram of a sequence to perform the reprogramming by the vehicle control device 1 according to the first embodiment. The reprogramming sequence according to the first embodiment is described below with reference to FIG. 4.

The operator starts reprogramming as in the traditional reprogramming sequence. The reprogramming device 2 inquires of the vehicle control device 1 about the unused area of the storage device 12 (area where the current version of the control program is not stored, and in addition, where the initialization of the storage region has been completed). The operation unit 11 makes a response about which one of the first area 124 or the second area 125 is unused with reference to the management data 123 together with the unused area head address 1232 and the unused area size 1233.

The reprogramming device 2 instructs the vehicle control device 1 to write the updated version of the control program to the unused area. The rewriting program 122 writes the updated version of the control program (to the second area 125 in FIG. 1) according to the instruction from the reprogramming device 2. After that, until the mode is changed to the normal mode, the operation is the same as that in the traditional sequence described in FIG. 3.

In the above sequence, since the rewriting program 122 writes the updated version of the control program to the unused area (here, initialized second area 125), it is not necessary to initialize that area before the writing. Therefore, the reprogramming sequence can be completed in a short time.

In the next reprogramming sequence, to reduce time to initialize the storage region, it is necessary to initialize the storage region of the writing destination before the next reprogramming sequence is started. Therefore, the rewriting program 122 initializes the unused area (here, the first area 124), for example, a period from the time when the ignition 3 of the vehicle is turned OFF to the time when the vehicle control device 1 is shut down. A method to maintain the power source after the ignition 3 has been turned OFF is described below.

Figure 5:
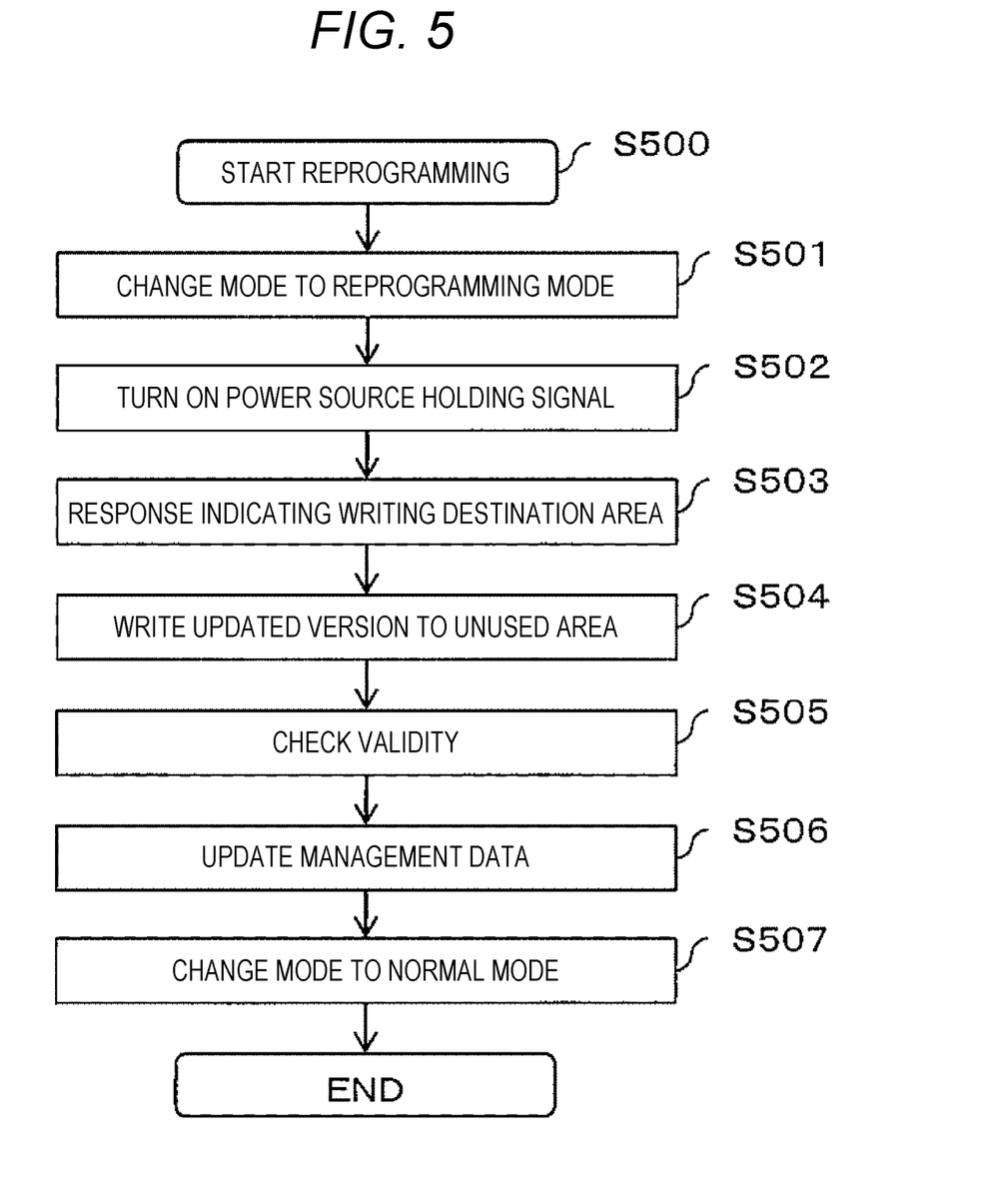
FIG. 5 is a flowchart to describe a procedure for performing the reprogramming sequence by a rewriting program 122.

FIG. 5 is a flowchart to describe a procedure for performing the reprogramming sequence by the rewriting program 122. Each step in FIG. 5 is described below.

(FIG. 5: Steps S500 and S501)

When receiving the reprogramming instruction from the reprogramming device 2, the operation unit 11 starts this flowchart and starts the rewriting program 122 (S500). The operation unit 11 changes its mode to the reprogramming mode (S501).

(FIG. 5: Step S502)

The rewriting program 122 turns ON a power source holding signal. The signal is used to connect a battery of the vehicle to the vehicle control device 1 and to continue to supply power even when the ignition 3 of the vehicle is turned OFF. The signal is described below in detail.

(FIG. 5: Steps S503 to S505)

According to the procedure described in FIG. 4, the rewriting program 122 receives the updated version of the control program from the reprogramming device 2 and writes it to the unused area (in FIG. 1, the second area 125). Then, the rewriting program 122 checks the validity of the updated version.

(FIG. 5: Steps S506 and S507)

The rewriting program 122 writes the number, the head address, and the size of the storage region where the control program before the update has been held (in FIG. 1, the first area 124) to the management data 123 (S506). By the above processing, the reprogramming sequence is completed, and the operation unit 11 changes its mode to the normal mode (S507).

Figure 6:
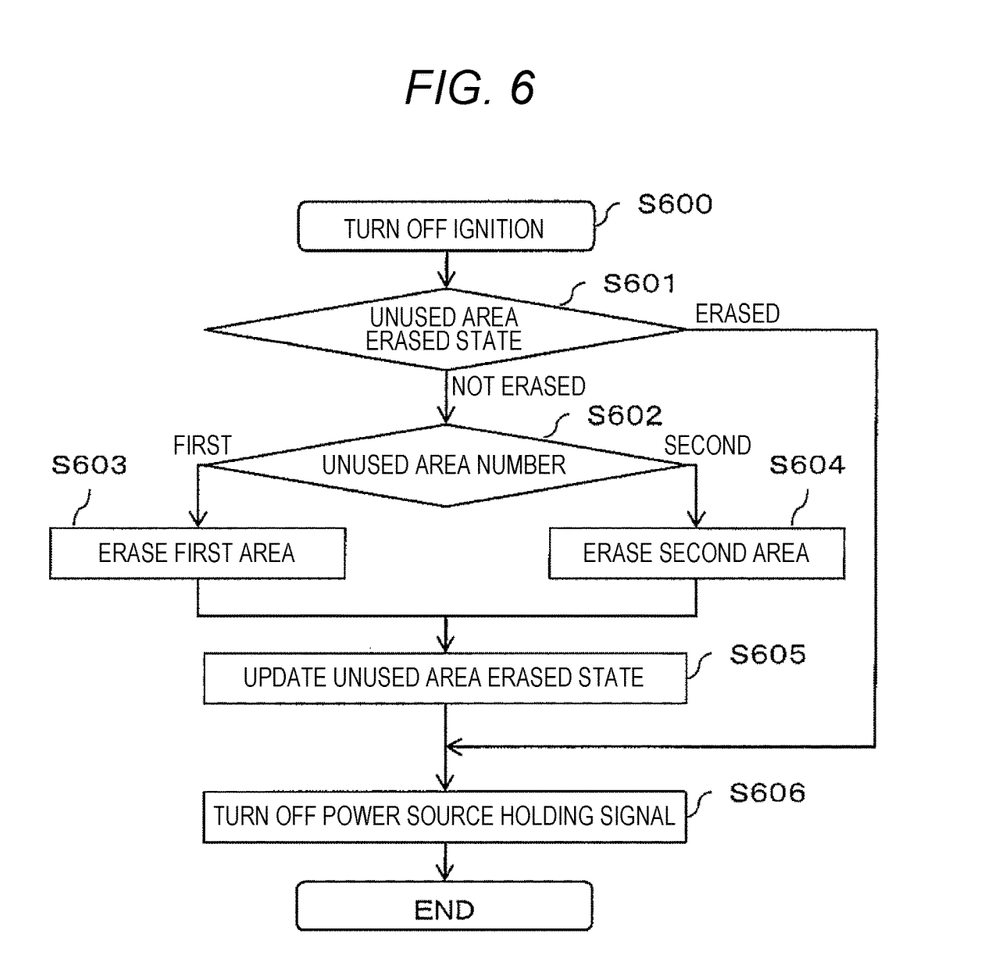
FIG. 6 is an operation flow of the rewriting program 122 when an ignition 3 is turned OFF.

FIG. 6 is an operation flow of the rewriting program 122 when the ignition 3 is turned OFF. Each step in FIG. 6 is described below.

(FIG. 6: Step S600)

When detecting that the ignition 3 is turned OFF according to an interruption signal and the like, the operation unit 11 starts this flowchart and starts the rewriting program 122.

(FIG. 6: Step S601)

The rewriting program 122 checks the unused area erased state 1234 of the management data 123. When it is indicated that the unused area erased state 1234 has been erased, the procedure proceeds to step S606. When it is indicated that the unused area erased state 1234 has not been erased, the procedure proceeds to step S602.

(FIG. 6: Step S601: Additional Explanation)

In step S603 or S604 to be described below, the rewriting program 122 initializes the storage region of the storage device 12. That is, when the ignition 3 is turned OFF, the rewriting program 122 initializes the storage region. Therefore, when the ignition 3 is turned ON in the middle of the initialization, the rewriting program 122 interrupts the initialization processing, and the operation unit 11 executes the startup program 121. In this way, there is a possibility that the initialization processing is interrupted. Therefore, the rewriting program 122 refers to the unused area erased state 1234 in this step and checks whether the initialization has been completed before starting the initialization.

(FIG. 6: Steps S602 to S604)

The rewriting program 122 specifies a storage region to be initialized with reference to the unused area number 1231 (S602). The rewriting program 122 initializes the storage region in which the old control program is stored according to the written unused area number 1231 (S603 and S604).

(FIG. 6: Steps S602 to S604: Additional Explanation)

In a case where the previous initialization processing is interrupted in the middle, the rewriting program 122 initializes the unused area again from the head address. When it is desired to restart the initialization processing from a point where the previous initialization processing has been interrupted, a method is considered in which an initialization start address and an initialized address are managed in the management data 123 and the initialization processing is restarted from the point where the previous processing has been interrupted with reference to the above addresses.

(FIG. 6: Steps S605 and S606)

The rewriting program 122 writes information, which indicates that the unused area has been erased, to the unused area erased state 1234 (S605). The rewriting program 122 turns OFF the power source holding signal (S606).

Figure 7:
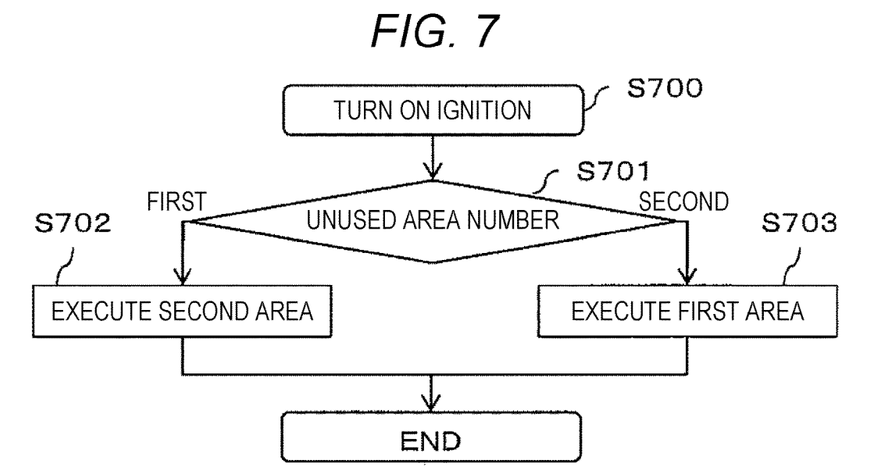

FIG. 7 is an operation flow of the startup program 121 when the ignition 3 is turned ON. Each step in FIG. 7 is described below.

(FIG. 7: Step S700)

When detecting that the ignition 3 is turned ON according to the interruption signal and the like, the operation unit 11 starts this flowchart and starts the startup program 121.

(FIG. 7: Steps S701 to S703)

The startup program 121 specifies a storage region where the current version of the control program is stored with reference to the unused area number 1231 of the management data 123 (S701). When the first area 124 is unused, the control program stored in the second area 125 is executed. Also, when the second area 125 is unused, the control program stored in the first area 124 is executed.

Figure 8:
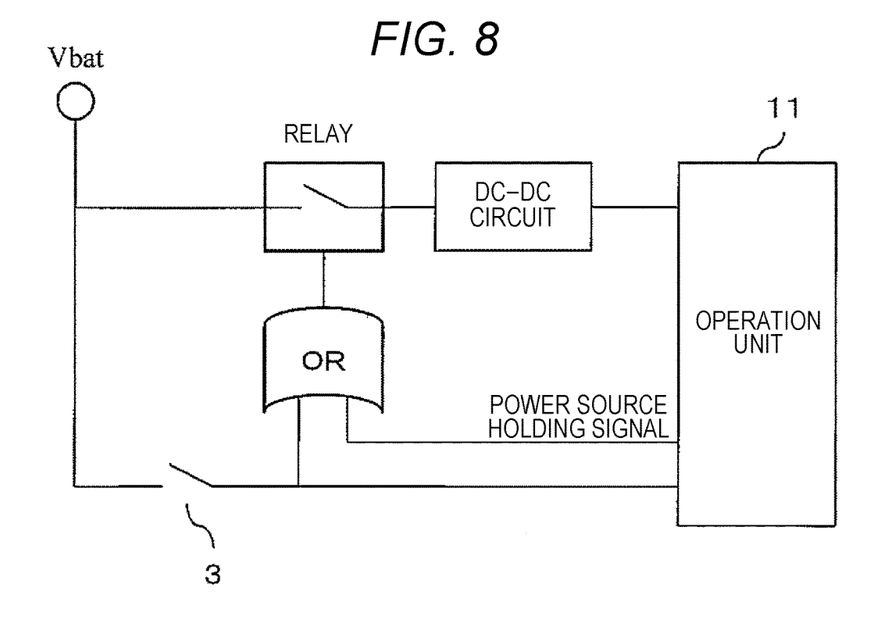
FIG. 8 is a diagram of a peripheral circuit of the vehicle control device 1.

FIG. 8 is a diagram of a peripheral circuit of the vehicle control device 1. For convenience of description, only the operation unit 11 of the vehicle control device 1 is illustrated. Other circuit configurations are included in the vehicle which has the vehicle control device 1 mounted therein.

In FIG. 8, when the ignition 3 is turned ON, a battery Vbat is connected to the vehicle control device 1, and the vehicle control device 1 operates while having the battery Vbat as a power source. A relay circuit is turned ON in a case where at least one of the ignition 3 and the power source holding signal output from the vehicle control device 1 (described in step S502) is turned ON and connects the battery Vbat to the vehicle control device 1. That is, when at least one of the ignition 3 and the power source holding signal is turned ON, the vehicle control device 1 can receive the power supply and can be operated.

The rewriting program 122 initializes the storage region by using a period of time when the ignition is turned OFF. Therefore, in step S502, while the power source holding signal is turned ON and the storage region is initialized, the power is continuously supplied. After the initialization processing has been finished, in step S606, the power source holding signal is turned OFF, and the battery Vbat is cut off.

<First Embodiment: Summary>

As described above, after storing the updated version of the control program in the second area 125, the vehicle control device 1 according to the first embodiment initializes the first area 124 before the next reprogramming sequence is restarted. According to this, not only the processing for storing the updated version of the control program in the second area 125 but also the next reprogramming sequence can be completed in a short time.

Also, after writing the updated version of the control program, the vehicle control device 1 according to the first embodiment initializes the unused area in a period from a time when the ignition 3 is turned OFF to a time when the vehicle control device 1 is shut down. Accordingly, the reprogramming sequence can be completed in a short time by effectively using a spare time of the vehicle control device 1.

<Second Embodiment>

Figure 9:
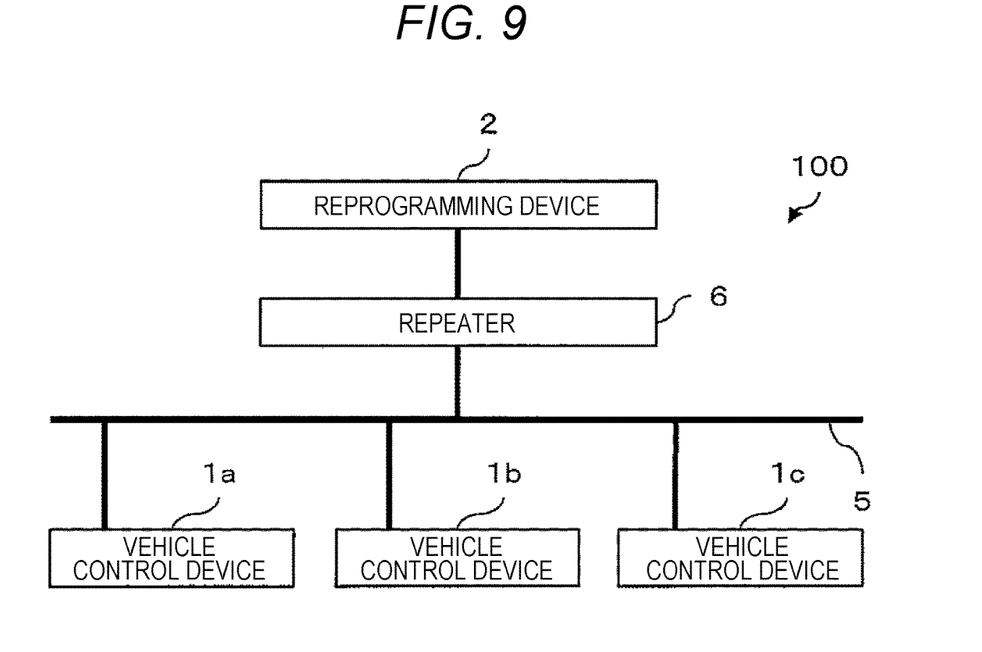
FIG. 9 is a diagram of a configuration of a reprogramming system 100 according to a second embodiment.

FIG. 9 is a diagram of a configuration of a reprogramming system 100 according to a second embodiment of the present invention. The reprogramming system 100 is a system in which vehicle control devices mounted in a vehicle respectively update control programs which are executed by these vehicle control devices. The reprogramming system 100 includes the plurality of vehicle control devices 1, a repeater 6, and a reprogramming device 2.

Since each vehicle control device 1 has a structure similar to that of the first embodiment, the vehicle control devices 1 are distinguished from each other by providing alphabets to the respective devices. However, the control program executed by at least one of the vehicle control devices 1 is different from the control program executed by the other vehicle control device 1.

The repeater 6 is arranged between the reprogramming device 2 and the vehicle control devices 1 and relays communication between the reprogramming device 2 and each vehicle control device 1 via an in-vehicle network 5. For example, the repeater 6 can be arranged between a terminal to connect the reprogramming device 2 to the vehicle and the in-vehicle network 5. However, the position of the repeater 6 is not limited to the above.

The in-vehicle network 5 is a bus network. While the repeater 6 is communicating with one of the vehicle control devices 1, the repeater 6 cannot communicate with the other vehicle control devices 1.

The reprogramming device 2 transmits the reprogramming instruction to each vehicle control device 1 and the updated version of the control program to be transmitted to each vehicle control device 1 to the repeater 6 once.

The repeater 6 transmits the reprogramming instruction and the updated version of the control program to either one of the vehicle control devices 1 (for example, vehicle control device 1a). The vehicle control device 1 which has received them starts the reprogramming sequence described in the first embodiment. While the rewriting program 122 is writing the updated version of the control program to the storage region, a communication slot of the in-vehicle network 5 is empty. Then, the repeater 6 transmits the reprogramming instruction and the updated version of the control program to the other vehicle control device 1 by using the above time zone. According to this, even in the bus-type in-vehicle network 5, the reprogramming instruction and the control program can be transmitted to the vehicle control devices 1 in parallel, and this makes the time required for the reprogramming work be shorter.

<Modification of the Present Invention>

The present invention is not limited to the embodiments described above and includes various modifications. The embodiments have been described in detail for easy understanding of the present invention. The embodiments are not limited to those including all the components described above.

In the first and second embodiments, the flash ROM is exemplified as the storage device 12. However, even when the other nonvolatile storage device is used, the present invention can be applied. This is because, since the storage region to which the control program is written is collectively updated in normal cases, old data stored in the storage region is erased once before the update. That is, even when the storage device, of which the storage region does not need to be initialized before new data is overwritten, such as a flash ROM is used, the present invention has a certain effect.

In the first and second embodiments, an example of the configuration has been described in which the storage device 12 is divided into the first area 124 and the second area 125. However, the same configuration can be realized by using two storage devices. The configuration similar to those of the first and second embodiments can be realized by providing two or more storage regions (or storage devices). In this case, for example, the control program is stored in the storage regions (or storage devices) in order.

In the reprogramming sequence, the latest version of the control program is normally written. However, there is a possibility to reprogram a down version of the control program for some reasons. In this case, the updated version of the control program indicates the down version of the control program. That is, the updated version of the control program is a control program written by the previous reprogramming sequence.

The structure, the function, processor, processing method, and the like can be realized with hardware by designing a part of them by using an integrated circuit. Also, the structure, the function, and the like can be realized with software by interpreting and executing programs, which realizes the respective functions, by a processor. Information such as a program, a table, and a file for realizing each function can be stored in a recording device such as a memory, a hard disk, and a solid state drive (SSD) and a record media such as an IC card, an SD card, and a DVD.

REFERENCE SIGNS LIST 1 vehicle control device
11 operation unit
12 storage device
121 startup program
122 rewriting program
123 management data
124 first area
125 second area
2 reprogramming device
3 ignition
4 power circuit
5 in-vehicle network
6 repeater
100 reprogramming system

The invention claimed is:

1. A vehicle control device comprising:
   a storage device configured to store a control program for implementing an operation to control a vehicle;
   an operation unit configured to execute the control program; and
   a rewriting unit configured to rewrite the control program stored in the storage device,
   wherein:
   the storage device includes a first storage unit and a second storage unit for storing the control program,
   after an updated version of the control program stored in the first storage unit has been stored in the second storage unit, the rewriting unit initializes the first storage unit when an ignition switch of the vehicle is turned OFF, and
   the operation unit executes the updated version of the control program which has been stored in the storage device by the rewriting unit.

2. The vehicle control device according to claim 1, wherein
   after the rewriting unit has stored the updated version of the control program in the storage device, the operation unit executes the updated version of the control program when the ignition switch is turned ON.

3. The vehicle control device according to claim 2, wherein
   when the ignition switch is turned ON while the first storage unit is initialized, the rewriting unit interrupts the processing for initializing the first storage unit, and the operation unit executes the updated version of the control program.

4. The vehicle control device according to claim 3, wherein
   the storage device stores management data for holding information indicating whether the rewriting unit has completed the initialization of the first storage unit,
   the rewriting unit writes the information indicating that the initialization of the first storage unit has been completed to the management data when the initialization of the first storage unit has been completed, and
   when the ignition switch is turned OFF, the rewriting unit does not initialize the first storage unit in a case where the information indicating that the initialization of the first storage unit has been completed has been written to the management data and initializes the first storage unit in a case where the information indicating that the initialization of the first storage unit has not been completed has been written to the management data.

5. The vehicle control device according to claim 1, wherein
   the storage device stores management data for holding information indicating which one of the first storage unit and the second storage unit stores the updated version of the control program, and
   the rewriting unit stores the new updated version of the control program in one of the first storage unit or the second storage unit which does not store the updated version of the control program and initializes the other storage unit.

6. The vehicle control device according to claim 1, wherein
the storage device is a device having a storage region which needs to be initialized before stored data is updated.

7. A reprogramming system comprising:
the plurality of vehicle control devices according to claim 1;
a reprogramming device configured to instruct the plurality of vehicle control devices to update the control program and transmit the updated version of the control program to the plurality of vehicle control devices; and
a repeater configured to relay communication between the reprogramming device and the plurality of vehicle control devices.

8. The reprogramming system according to claim 7, wherein
a bus network connects between the repeater and the plurality of vehicle control devices,
at least one of the vehicle control devices executes the control program different from that of the other vehicle control device, and
when one of the vehicle control devices writes the updated version of the control program to the storage device, the repeater transmits the updated version of the control program to the other vehicle control device.

9. The vehicle control device according to claim 1, wherein
after the updated version of the control program stored in the first storage unit has been stored in the second storage unit, the rewriting unit initializes the first storage unit during a period from a first time when the ignition switch of the vehicle is turned OFF to a second time when the vehicle control device is shut down.

10. The vehicle control device according to claim 1, wherein
in a process in which the updated version of the control program is written to the second storage unit, the rewriting unit connects a battery included in the vehicle to the vehicle control device before initializing the first storage unit.

11. A vehicle control device comprising:
a storage device configured to store a control program for implementing an operation to control a vehicle;
an operation unit configured to execute the control program; and
a rewriting unit configured to rewrite the control program stored in the storage device,
wherein:
the storage device includes a first storage unit and a second storage unit for storing the control program,
after an updated version of the control program stored in the first storage unit has been stored in the second storage unit, the rewriting unit initializes the first storage unit before starting to execute a command to instruct to update the control program stored in the second storage unit, and
the operation unit executes the updated version of the control program which has been stored in the storage device by the rewriting unit,
wherein after the updated version of the control program stored in the first storage unit has been stored in the second storage unit, the rewriting unit initializes the first storage unit when an ignition switch of the vehicle is turned OFF, and
wherein in a process in which the updated version of the control program is written to the second storage unit, the rewriting unit connects a battery included in the vehicle to the vehicle control device regardless of the ON/OFF state of the ignition switch before initializing the first storage unit.

* * * * *